(12) United States Patent
Murasawa et al.

(10) Patent No.: US 12,497,675 B2
(45) Date of Patent: *Dec. 16, 2025

(54) HOT-STAMPING FORMED BODY

(71) Applicant: NIPPON STEEL CORPORATION, Tokyo (JP)

(72) Inventors: Kodai Murasawa, Tokyo (JP); Shingo Fujinaka, Tokyo (JP); Yuri Toda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 208 days.

This patent is subject to a terminal disclaimer.

(21) Appl. No.: 18/273,472

(22) PCT Filed: Feb. 10, 2022

(86) PCT No.: PCT/JP2022/005360
§ 371 (c)(1),
(2) Date: Jul. 20, 2023

(87) PCT Pub. No.: WO2022/172993
PCT Pub. Date: Aug. 18, 2022

(65) Prior Publication Data
US 2024/0117477 A1    Apr. 11, 2024

(30) Foreign Application Priority Data
Feb. 10, 2021  (JP) .................. 2021-019911

(51) Int. Cl.
| | | |
|---|---|---|
| C22C 38/32 | (2006.01) |
| B32B 15/01 | (2006.01) |
| C21D 1/18 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/14 | (2006.01) |
| C22C 38/16 | (2006.01) |
| C22C 38/28 | (2006.01) |

(52) U.S. Cl.
CPC ............ *C22C 38/32* (2013.01); *B32B 15/011* (2013.01); *C21D 1/18* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0221* (2013.01); *C21D 8/0247* (2013.01); *C21D 8/0278* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/28* (2013.01); *C21D 2211/001* (2013.01); *C21D 2211/008* (2013.01)

(58) Field of Classification Search
None
See application file for complete search history.

(56) References Cited

U.S. PATENT DOCUMENTS

| | | | | |
|---|---|---|---|---|
| 8,802,005 | B2 * | 8/2014 | Mizuno ............... | C22C 38/06 |
| | | | | 420/128 |
| 2003/0084965 | A1 | 5/2003 | Nishi et al. | |
| 2011/0226393 | A1 * | 9/2011 | Senuma ............... | C22C 38/04 |
| | | | | 148/645 |
| 2013/0167980 | A1 * | 7/2013 | Kawata ............... | C22C 38/12 |
| | | | | 148/333 |
| 2014/0004378 | A1 * | 1/2014 | Tanahashi ........... | C21D 9/46 |
| | | | | 148/531 |

(Continued)

FOREIGN PATENT DOCUMENTS

| | | |
|---|---|---|
| EP | 3 943 623 A1 | 1/2022 |
| JP | 2002-102980 A | 4/2002 |

(Continued)

OTHER PUBLICATIONS

U.S. Office Action for U.S. Appl. No. 17/795,741, dated Dec. 26, 2024.

(Continued)

*Primary Examiner* — Seth Dumbris
(74) *Attorney, Agent, or Firm* — Birch, Stewart, Kolasch & Birch, LLP

(57) ABSTRACT

This hot-stamping formed body includes, as a chemical composition, by mass %: C: 0.15% or more and 0.50% or less; Si: 0.10% or more and 3.00% or less; Mn: 0.10% or more and 3.00% or less; P: less than 0.10%; S: less than 0.10%; N: less than 0.10%; Ti: 0.020% or more and 0.150% or less; B: 0.002% or more and 0.010% or less; optionally Al, Cr, Mo, Co, Ni, Cu, V, W, Ca, Mg, and REM; and a remainder including Fe and impurities, in which a microstructure of the hot-stamping formed body includes, by volume fraction, 85% or more of martensite and less than 15% of retained austenite, and in the microstructure, a standard deviation of a frequency distribution of nanohardnesses is 0.70 GPa or less, and an average grain size is 4.0 μm or less.

4 Claims, No Drawings

(56) References Cited

U.S. PATENT DOCUMENTS

2020/0157666 A1\* 5/2020 Sakakibara ........... C22C 38/005
2020/0385836 A1   12/2020 Yi et al.
2022/0127705 A1   4/2022 Fujinaka et al.

FOREIGN PATENT DOCUMENTS

| JP | 2006-152427 A | 6/2006 |
| JP | 2010-65294 A | 3/2010 |
| JP | 2010-65295 A | 3/2010 |
| JP | 2010-70806 A | 4/2010 |
| WO | WO 2018/151332 A1 | 8/2018 |
| WO | WO 2019/003543 A1 | 1/2019 |
| WO | WO 2020/189761 A1 | 9/2020 |

OTHER PUBLICATIONS

U.S. Office Action for U.S. Appl. No. 17/795,741, dated Jun. 12, 2025.

\* cited by examiner

HOT-STAMPING FORMED BODY

TECHNICAL FIELD OF THE INVENTION

The present invention relates to a hot-stamping formed body.

Priority is claimed on Japanese Patent Application No. 2021-019911, filed Feb. 10, 2021, the content of which is incorporated herein by reference.

RELATED ART

In recent years, there has been a demand for curbing the consumption of chemical fuels in order to protect the environment and prevent global warming. To such a demand, for example, vehicles, which are indispensable for daily life and activities as movement units, are no exception. In response to such a demand, in vehicles, an improvement in fuel efficiency or the like by a reduction in weight of a vehicle body or the like is being studied. Since most of structures of vehicles are formed of iron, particularly steel sheets, thinning steel sheets and reducing the weight has a great effect on the reduction in weight of a vehicle body. However, when the steel sheet is simply reduced in thickness to reduce the weight of the steel sheet, there is a concern that the steel sheet as a structure decreases in strength and safety decreases. Therefore, in order to reduce the thickness of the steel sheet, it is required to increase a mechanical strength of the steel sheet to be used so as not to reduce the strength of the structure.

Therefore, by increasing the mechanical strength of the steel sheet, research and development are being conducted on a steel sheet that can maintain or increase the mechanical strength even when the steel sheet is made thinner than previously used steel sheets. Such a demand for a steel sheet is applied not only to a vehicle manufacturing industry but also to various manufacturing industries.

In general, a material having high mechanical strength tends to have low shape fixability in a forming process such as bending, and in a case where the material is processed into a complex shape, the processing itself becomes difficult. As one of methods for solving problems of formability, a so-called "hot stamping method" can be mentioned. In this hot stamping method, a material to be formed is heated to a high temperature once, and after the material softened by the heating is subjected to press working to be formed or simultaneously with the forming, the material is rapidly cooled using heat removal by contact with a press die.

According to the hot stamping method, since the material is once heated to a high temperature to be softened and the material is subjected to the press working in a softened state, the material can be easily subjected to press working. Therefore, by this hot press working, a press-formed article (hot-stamping formed body) having both good shape fixability and high mechanical strength can be obtained. In particular, in a case where the material is steel, the mechanical strength of the press-formed article can be increased due to a quenching effect by cooling after forming.

For example, Patent Document 1 describes that a member having a tensile strength of 1400 MPa or more is obtained by performing hot stamping on a steel sheet having a tensile strength of 500 to 600 MPa.

Patent Document 2 discloses a steel sheet member having high strength and high toughness in which a grain size of martensite is refined by controlling a Mn content and a total amount of at least one of Cr, Mo, Cu, and Ni and Mn and performing press working once or more for forming a steel sheet member into a predetermined shape until an Ms point is reached in a cooling step.

Since the members described in Patent Documents 1 and 2 have high strength, the members are often used as deformation-suppressing members, which are intended to protect occupants in the event of a collision, such as a door impact beam and a center pillar upper of a vehicle.

PRIOR ART DOCUMENT

Patent Document

[Patent Document 1] Japanese Unexamined Patent Application, First Publication No. 2002-102980
[Patent Document 2] Japanese Unexamined Patent Application, First Publication No. 2010-070806

DISCLOSURE OF THE INVENTION

Problems to be Solved by the Invention

However, in recent years, with an increasing demand for safety of vehicles, materials used for vehicle components are also required to have superior collision resistance (impact absorption). Specifically, from the viewpoint of preventing a member from cracking at the time of a collision, the member is required to have excellent bendability.

As a result of studies by the present inventors, it was found that a hot-stamping formed body (member) in the related art may not be able to meet a recent demand for higher bendability.

The present invention has been made in view of the above.

An object of the present invention is to provide a hot-stamping formed body having high strength and excellent bendability.

Means for Solving the Problem

The present inventors studied methods to improve bendability in a hot-stamping formed body having high strength. As a result, it was found that high strength and excellent bendability can be obtained by causing a microstructure of a hot-stamping formed body to primarily contain martensite, and causing the microstructure to have a reduced unevenness in hardness and a small grain size.

It was also found that, in order to obtain the above-described structure, a forming temperature during hot-stamping and an amount of strain to be introduced are important.

The present invention has been made in view of the above findings. The gist of the present invention is as follows.

[1] A hot-stamping formed body according to an aspect of the present invention includes, as a chemical composition, by mass %: C: 0.15% or more and 0.50% or less; Si: 0.10% or more and 3.00% or less; Mn: 0.10% or more and 3.00% or less; P: less than 0.10%; S: less than 0.10%; N: less than 0.10%; Ti: 0.020% or more and 0.150% or less; B: 0.002% or more and 0.010% or less; Al: 0% or more and 2.0% or less; Nb: 0% or more and 0.150% or less; Cr: 0% or more and 1.0% or less; Mo: 0% or more and 1.0% or less; Co: 0% or more and 2.0% or less; Ni: 0% or more and 3.0% or less; Cu: 0% or more and 1.0% or less; V: 0% or more and 1.0% or less; W: 0% or more and 1.0% or less; Ca: 0% or more and 0.0100% or less; Mg: 0% or more and 0.0100% or less;

REM: 0% or more and 0.0100% or less; and a remainder including Fe and impurities, in which a microstructure of the hot-stamping formed body includes, by volume fraction, 85% or more of martensite and less than 15% of retained austenite, and in the microstructure, a standard deviation of a frequency distribution of nanohardnesses is 0.70 GPa or less, and an average grain size is 4.0 μm or less.

[2] The hot-stamping formed body according to [1] may include, as the chemical composition, by mass %, one or two or more selected from the group consisting of: Al: 0.0002% or more and 2.0% or less; Nb: 0.010% or more and 0.150% or less; Cr: 0.1% or more and 1.0% or less; Mo: 0.1% or more and 1.0% or less; Co: 0.1% or more and 2.0% or less; Ni: 0.1% or more and 3.0% or less; Cu: 0.1% or more and 1.0% or less; V: 0.1% or more and 1.0% or less; W: 0.1% or more and 1.0% or less; Ca: 0.0010% or more and 0.0100% or less; Mg: 0.0010% or more and 0.0100% or less; and REM: 0.0010% or more and 0.0100% or less.

[3] In the hot-stamping formed body according to [1] or [2], a surface of the hot-stamping formed body may have an alloy layer.

Effects of the Invention

According to the above aspect of the present invention, it is possible to provide a hot-stamping formed body having high strength and excellent bendability.

EMBODIMENTS OF THE INVENTION

Hereinafter, a hot-stamping formed body according to an embodiment of the present invention (a hot-stamping formed body according to the present embodiment) will be described.

In the hot-stamping formed body according to the present embodiment, the hot-stamping formed body has a predetermined chemical composition, and a microstructure of the hot-stamping formed body includes, by volume fraction, 85% or more of martensite and less than 15% of retained austenite, and in the microstructure, a standard deviation of a frequency distribution of nanohardnesses is 0.70 GPa or less, and an average grain size is 4.0 μm or less.

<Chemical Composition>

The chemical composition of the hot-stamping formed body according to the present embodiment will be described. Unless otherwise specified, "%" indicating the amount of each element in the chemical composition is mass %.

C: 0.15% or More and 0.50% or Less

C is an important element for obtaining a desired tensile strength for a vehicle component or the like in the hot-stamping formed body. When a C content is less than 0.15%, martensite is soft and it is difficult to obtain sufficient tensile strength. Therefore, the C content is set to 0.15% or more. The C content is preferably 0.30% or more, and more preferably 0.40% or more.

On the other hand, when the C content is more than 0.50%, coarse carbides are generated in steel, and toughness of the hot-stamping formed body decreases. Therefore, the C content is set to 0.50% or less. The C content is preferably 0.48% or less.

Si: 0.10% or More and 3.00% or Less

Si is an element that is effective in enhancing hardenability of the steel and stably securing strength after quenching. In order to obtain this effect, a Si content needs to be set to 0.10% or more. The Si content is preferably 0.35% or more.

On the other hand, when the Si content is more than 3.00%, a heating temperature required for austenitic transformation becomes significantly high during heating for hot stamping. This may lead to an increase in costs required for a heat treatment. Furthermore, when the Si content is more than 3.00%, toughness of a quenched portion deteriorates. Therefore, the Si content is set to 3.00% or less. The Si content is preferably 2.60% or less.

Mn: 0.10% or More and 3.00% or Less

Mn is a very effective element for enhancing the hardenability of the steel and stably securing the strength after quenching. Mn is an element that further lowers an Ac3 point and promotes the lowering of a quenching treatment temperature. When a Mn content is less than 0.10%, these effects are not sufficient, so that the Mn content is set to 0.10% or more. The Mn content is preferably 0.30% or more.

On the other hand, when the Mn content is more than 3.00%, the above effects are saturated, and the toughness and bendability of the quenched portion deteriorate. Therefore, the Mn content is set to 3.00% or less. The Mn content is preferably 2.80% or less, and more preferably 2.50% or less.

P: Less than 0.10%

P is an element that segregates to grain boundaries and reduces intergranular strength. When a P content is 0.10% or more, the intergranular strength significantly decreases, and the bendability of the hot-stamping formed body decreases. Therefore, the P content is set to less than 0.10%. The P content is preferably 0.05% or less. A lower limit of the P content is not particularly limited. However, when the P content is reduced to less than 0.0001%, a dephosphorization cost is increased significantly, which is economically undesirable. Therefore, on a practical steel sheet, 0.0001% is a substantial lower limit.

S: Less than 0.10%

S is an element that forms inclusions in the steel. When a S content is 0.10% or more, inclusions are generated in the steel, and the bendability of the hot-stamping formed body decreases. Therefore, the S content is set to less than 0.10%. The S content is preferably 0.02% or less, and more preferably 0.01% or less. A lower limit of the S content is not particularly limited. However, when the S content is reduced to less than 0.0010%, a desulfurization cost is increased significantly, which is economically undesirable. Therefore, on a practical steel sheet, 0.0010% is a substantial lower limit.

N: Less than 0.10%

N is an element that forms nitrides and lowers the bendability of the hot-stamping formed body. When a N content is 0.10% or more, coarse nitrides are generated in the steel, and the bendability of the hot-stamping formed body significantly decreases. Therefore, the N content is set to less than 0.10%. The N content is preferably 0.01% or less, 0.0075% or less, or 0.0030% or less. A lower limit of the N content is not particularly limited. However, when the N content is reduced to less than 0.0001%, a denitrification cost is increased significantly, which is economically undesirable. Therefore, on a practical steel sheet, 0.0001% is a substantial lower limit.

Ti: 0.020% or More and 0.150% or Less

Ti is an element that improves the strength of the hot-stamping formed body by solid solution strengthening. Ti is an element that improves the toughness of the hot-stamping formed body by suppressing coarsening of austenite grains in a heating step. In a case where a Ti content is less than 0.020%, these effects are not sufficient. Therefore, the Ti content is set to 0.020% or more.

On the other hand, when the Ti content is more than 0.150%, TIN, which is the origin of bending cracks, is formed, and the bendability of the hot-stamping formed body deteriorates. Therefore, the Ti content is set to 0.150% or less. The Ti content is preferably 0.120% or less.

B: 0.002% or More and 0.010% or Less

B is an element that segregates at the grain boundaries and improves the intergranular strength. B is a very effective element for enhancing the hardenability of the steel and stably securing the strength after quenching. In a case where a B content is less than 0.002%, these effects are not sufficient. Therefore, the B content is set to 0.002% or more.

On the other hand, when the B content is more than 0.010%, coarse BN, which is the origin of bending cracks, is formed, and the bendability of the hot-stamping formed body deteriorates. Therefore, the B content is set to 0.010% or less. The B content is preferably 0.008% or less.

In the chemical composition of the hot-stamping formed body according to the present embodiment, elements other than the above-described elements, that is, the remainder may include Fe and impurities. Alternatively, in order to further improve various properties, one or more elements selected from the group consisting of Al, Nb, Cr, Mo, Co, Ni, Cu, V. W. Ca, Mg, and REM may be contained within ranges shown below. These elements are optional elements and do not necessarily have to be contained. Therefore, lower limits thereof are 0%.

Here, the "impurities" mean elements that are incorporated due to various factors including raw materials such as ore and scrap and a manufacturing process when the steel sheet is industrially manufactured, and are acceptable in a range without adversely affecting the properties of the hot-stamping formed body according to the present embodiment.

Al: 0% or More and 2.0% or Less

Al is an element having an action of deoxidizing molten steel and achieving soundness of the steel (suppressing the occurrence of defects such as blowholes in the steel). In a case where Al is contained, an Al content is preferably set to 0.0002% or more in order to obtain a sufficient effect. The Al content is more preferably 0.001% or more, and even more preferably 0.010% or more.

On the other hand, when the Al content is more than 2.0%, coarse oxides are generated, and the toughness of the hot-stamping formed body is impaired. Therefore, the Al content is set to 2.0% or less.

Nb: 0% or More and 0.150% or Less

Nb is an element that contributes to an improvement in the strength of the hot-stamping formed body by solid solution strengthening and thus may be contained as necessary. In a case where Nb is contained, a Nb content is preferably set to 0.010% or more in order to obtain a sufficient effect. The Nb content is more preferably 0.030% or mom.

On the other hand, even when the Nb content is set to more than 0.150%, the above effect is saturated. Therefore, the Nb content is set to 0.150% or less. The Nb content is preferably 0.120% or less.

Cr: 0% or More and 1.0% or Less

Cr is an element that contributes to an improvement in the strength of the hot-stamping formed body by solid solution strengthening and thus may be contained as necessary. In a case where Cr is contained, a Cr content is preferably set to 0.1% or more in order to obtain a sufficient effect. The Cr content is more preferably 0.2% or more.

On the other hand, even when the Cr content is set to more than 1.0%, the above effect is saturated and economic efficiency is lowered. Therefore, the Cr content is set to 1.0% or less. The Cr content is preferably 0.8% or less.

Mo: 0% or More and 1.0% or Less

Mo is an element that contributes to an improvement in the strength of the hot-stamping formed body by solid solution strengthening. Therefore, Mo may be contained as necessary. In a case where Mo is contained, a Mo content is preferably set to 0.1% or more in order to obtain a sufficient effect. The Mo content is more preferably 0.2% or more.

On the other hand, even when the Mo content is set to more than 1.0%, the above effect is saturated and the economic efficiency is lowered. Therefore, the Mo content is set to 1.0% or less. The Mo content is preferably 0.8% or less.

Co: 0% or More and 2.0% or Less

Co is an element effective for enhancing the hardenability of the steel and stably securing the strength of the steel after quenching, and thus may be contained as necessary. In a case where Co is contained, a Co content is preferably set to 0.1% or more in order to obtain a sufficient effect. The Co content is more preferably 0.2% or more.

On the other hand, when the Co content is more than 2.0%, the above effects are saturated and the economic efficiency is lowered. Therefore, the Co content is set to 2.0% or less.

Ni: 0% or More and 3.0% or Less

Ni is an element effective for enhancing the hardenability of the steel and stably securing the strength of the steel after quenching, and thus may be contained as necessary. In a case where Ni is contained, a Ni content is preferably set to 0.1% or more in order to obtain a sufficient effect. The Ni content is more preferably 0.2% or more.

On the other hand, when the Ni content is more than 3.0%, the above effects are saturated and the economic efficiency is lowered. Therefore, the Ni content is set to 3.0% or less.

Cu: 0% or More and 1.0% or Less

Cu is an element that contributes to an improvement in the strength of the hot-stamping formed body by solid solution strengthening and thus may be contained as necessary. In a case where Cu is contained, a Cu content is preferably set to 0.1% or more in order to obtain a sufficient effect. The Cu content is more preferably 0.2% or more.

On the other hand, even when the Cu content is set to more than 1.0%, the above effect is saturated and the economic efficiency is lowered. Therefore, the Cu content is set to 1.0% or less. The Cu content is preferably 0.8% or less.

V: 0% or More and 1.0% or Less

V is an element that contributes to an improvement in the strength of the hot-stamping formed body by solid solution strengthening and thus may be contained as necessary. In a case where V is contained, a V content is preferably set to 0.1% or more in order to obtain a sufficient effect. The V content is more preferably 0.2% or more.

On the other hand, even when the V content is set to more than 1.0%, the above effect is saturated and the economic efficiency is lowered. Therefore, the V content is set to 1.0% or less. The V content is preferably 0.8% or less.

W: 0% or More and 1.0% or Less

W is an element having an action of deoxidizing molten steel and achieving the soundness of the steel, and thus may be contained as necessary. In a case where W is contained, a W content is preferably set to 0.1% or more in order to obtain a sufficient effect.

On the other hand, when the W content is more than 1.0%, the above effects are saturated and the economic efficiency is lowered. Therefore, the W content is set to 1.0% or less.

Ca: 0% or More and 0.0100% or Less

Ca is an element having an action of deoxidizing molten steel and achieving the soundness of the steel, and improves the bendability of the hot-stamping formed body. Therefore, Ca may be contained as necessary. In order to obtain the above effect, a Ca content is preferably set to 0.0010% or more.

On the other hand, when the Ca content is more than 0.0100%, the above-mentioned effect is saturated and an increase in cost is incurred. Therefore, the Ca content is set to 0.0100% or less. The Ca content is preferably 0.0080% or less.

Mg: 0% or More and 0.0100% or Less

Mg is an element having an action of deoxidizing molten steel and achieving the soundness of the steel, and improves the bendability of the hot-stamping formed body. Therefore, Mg may be contained as necessary. In order to obtain the above effect, a Mg content is preferably set to 0.0010% or more.

On the other hand, even when the Mg content is more than 0.0100%, the above effect is saturated and an increase in cost is incurred. Therefore, the Mg content is set to 0.0100% or less. The Mg content is preferably 0.0080% or less.

REM: 0% or More and 0.0100% or Less

REM is an element having an action of deoxidizing molten steel and achieving the soundness of the steel, and improves the bendability of the hot-stamping formed body. Therefore, REM may be contained as necessary. In order to obtain the above effect, a REM content is preferably set to 0.0010% or more.

On the other hand, even when the REM content is more than 0.0100%, the above effect is saturated and an increase in cost is incurred. Therefore, the REM content is set to 0.0100% or less. The REM content is preferably 0.0080% or less.

In the present embodiment, REM refers to a total of 17 elements including Sc, Y, and lanthanoids. In the present embodiment, the REM content refers to the total amount of these elements. Lanthanoids are added in the form of mischmetal in industry.

The chemical composition of the hot-stamping formed body described above may be measured by a general analytical method. For example, the chemical composition may be measured using inductively coupled plasma-atomic emission spectrometry (ICP-AES). C and S may be measured using a combustion-infrared absorption method, and N may be measured using an inert gas fusion-thermal conductivity method.

Next, a metallographic structure of the hot-stamping formed body according to the present embodiment will be described.

<Microstructure (Metallographic Structure)>

[85% or More of Martensite and Less than 15% of Retained Austenite are Included by Volume Fraction]

Martensite is an important structure for increasing the tensile strength of the hot-stamping formed body (steel sheet after hot stamping). When a volume fraction of martensite is less than 85%, sufficient strength (tensile strength) cannot be obtained. Therefore, the volume fraction of martensite is set to 85% or more. A preferable volume fraction of martensite is 90% or more, or 95% or more.

An upper limit of the volume fraction of martensite does not need to be particularly set and may be 100%. However, in order to significantly increase the volume fraction of martensite, it is necessary to increase a heating temperature of the steel sheet or increase a cooling rate in a hot stamping step, which may impair productivity of hot-stamping formed articles. Therefore, the volume fraction of martensite may be set to 99% or less or 98% or less. In the present embodiment, martensite includes tempered martensite and fresh martensite.

As the remainder other than the above-described martensite, less than 15% of retained austenite may be included. Retained austenite has an action of improving the ductility of the hot-stamping formed body. Therefore, a volume fraction of retained austenite may be set to 1% or more or 2% or more. In addition to martensite and retained austenite, bainite may be further included as long as a volume fraction thereof is 10% or less. It is preferable that ferrite and pearlite are not included.

The volume fraction of each phase is obtained by the following method.

First, a sample is collected from a position avoiding an end portion of the hot-stamping formed body (for example, a position 50 mm or more away from an end surface of the hot-stamping formed body) so that a sheet thickness cross section can be observed. A (¼ thickness) region of ¼ of a sheet thickness from a surface of the steel sheet on the observed section of the sample is chemically polished in a range of an area of $4.0 \times 10^{-4}$ $m^2$ or more. A retained austenite fraction is measured for the polished surface using an X-ray diffractometer (XRD). For the measurement, a Co tube is used as an X-ray source, and as plane indices, (100), (200), and (211) peaks of a bcc phase and (111), (200), and (220) peaks of an fcc phase are used.

In addition, a sample was collected from a position avoiding the end portion of the hot-stamping formed body (for example, a position 50 mm or more away from the end surface of the hot-stamping formed body) so that a sheet thickness cross section can be observed, the observed section of the sample is mechanically polished to a mirror finish and is then subjected to nital etching, and secondary electron image observation is performed using a scanning electron microscope on an area of $2.0 \times 10^{-9}$ $m^2$ or more in total in one or a plurality of observed visual fields of a range of a ⅛ thickness to a ⅜ thickness centered on the ¼ thickness from the surface of the steel sheet in the observed section. As a result of the observation, a region having a substructure in grains and having cementite precipitated with a plurality of variants is determined to be tempered martensite. A region having high brightness and having no substructure exposed by etching is determined to be fresh martensite or retained austenite. A martensite fraction (a sum of a tempered martensite fraction and a fresh martensite fraction) is measured by subtracting the retained austenite fraction obtained by the XRD measurement from fractions of the regions determined to be tempered martensite, fresh martensite, and retained austenite).

In addition, as a result of the secondary electron image observation, a region having a substructure in the grains and having cementite precipitated with the same variant is determined to be bainite, while a region containing no carbide is determined to be ferrite and a region containing carbides is determined to be pearlite among regions having no substructure in the grains.

[Standard Deviation of Frequency Distribution of Nano-hardnesses is 0.70 GPa or Less]

[Average Grain Size is 4.0 μm or Less]

The present inventors studied methods to improve the bendability in a hot-stamping formed body having high strength. In the present embodiment, as an index of bendability, a strength-bending angle balance calculated by TS×α is used by using a bending angle (α) obtained from a plate bending test (VDA test), which is intended to evaluate a cracking behavior during crushing of a member, and a tensile strength (TS).

As a result of studies by the present inventors, it was found that high strength and excellent bendability can be obtained by reducing unevenness in hardness and reducing grain sizes in the microstructure. Specifically, in a region centered on a thickness ¼ (¼ thickness) position from the surface, when a standard deviation of a frequency distribution of nanohardnesses obtained by conducting a nanoindentation test is 0.70 GPa or less and an average grain size is 4.0 μm or less, an excellent strength-bending angle balance can be obtained.

It is considered that the reason why the strength-bending angle balance is improved by reducing the standard deviation of the frequency distribution of nanohardnesses and reducing the average grain size is that the generation of voids, which become the origin of ductile fracture, can be suppressed by reducing unevenness in hardness in the microstructure, and the propagation of ductile fracture cracks can be suppressed by reducing the average grain size.

When the standard deviation of the frequency distribution of the nanohardnesses is more than 0.70 GPa or the average grain size is more than 4.0 μm, a sufficient strength-bending angle balance cannot be obtained.

The grain size mentioned in the present embodiment refers to, when a boundary of a bcc phase with an orientation difference of 5° or more from an adjacent measurement region is defined as a grain boundary and a range surrounded by the grain boundary is defined as a grain, a circle equivalent diameter of the grain.

The hot-stamping formed body according to the present embodiment has a structure primarily containing martensite. The martensite structure has a morphology in which one prior austenite grain is formed of a plurality of packets, one packet is formed of a plurality of blocks, and one block is formed of a plurality of laths. An orientation difference between adjacent laths is less than 5°, and an orientation difference between adjacent blocks is 5° or more. Therefore, the average grain size in the present embodiment corresponds to measurement of an average block diameter of martensite.

The standard deviation of the frequency distribution of the nanohardnesses and the average grain size may satisfy the above requirements for at least a part of the hot-stamping formed body. In particular, in a microstructure of a region that undergoes severe deformation at the time of a collision during use as a vehicle component, it is preferable that the standard deviation of the frequency distribution of the nanohardnesses and the average grain size are within the above ranges.

The standard deviation of the frequency distribution of the nanohardnesses is obtained by conducting a nanoindentation test in the following manner.

A sample is collected from the hot-stamping formed body so that a cross section (L-section) perpendicular to a sheet width direction can be observed. A region of the sample having a width of 150 μm in a sheet thickness direction and 600 μm or more in a rolling direction centered on the thickness ¼ position (¼ thickness portion) from the surface in the sheet thickness direction is electrolytically polished. Thereafter, a nanohardness of each point is measured by pressing a Berkovich indenter into the region for a total of 100 points, five points in the sheet thickness direction×20 points in the rolling direction, at an interval of 30 μm with a pressing load of 2,000 μN. The frequency distribution of the obtained nanohardnesses is obtained, and the standard deviation is calculated.

In the present embodiment, as described above, the nanohardness is the hardness of the small region measured by pressing the Berkovich indenter with a pressing load of 2,000 μN. When the nanohardness is measured by a normal Vickers hardness test (for example, with a load of 1 kgf), an indentation becomes large, and the hardness of the small region cannot be evaluated. Therefore, even for a material having a small unevenness in hardness in the Vickers hardness test, it cannot be said that the standard deviation of the frequency distribution of nanohardnesses as evaluated in the present embodiment is 0.70 GPa or less.

In addition, the average grain size is measured by the following method using an EBSD method.

A sample is collected from the hot-stamping formed body so that a cross section (L-section) perpendicular to the sheet width direction can be observed. A region of the sample having a width of 240 μm in the sheet thickness direction and 80 μm or more in the rolling direction centered on the thickness ¼ position (¼ thickness portion) from the surface in the sheet thickness direction is electrolytically polished. Thereafter, EBSD measurement is performed on the region at an accelerating voltage of 20 kV, an irradiation current of 18 mA, and a measurement pitch of 0.4 μm, and the region is analyzed using OIM Analysis (registered trademark). A boundary with an orientation difference of 5° or more from an adjacent measurement region is defined as a grain boundary, a range surrounded by the grain boundary is defined as a grain, a circle equivalent diameter of the grain is defined as a grain size. An average of the grain sizes of the measurement regions is set as the average grain size.

However, in the present embodiment, the average grain size is calculated only for grains having a bcc structure. In addition, grains having a grain area of less than two pixels are excluded from the grain size measurement.

[Mechanical Properties]

The hot-stamping formed body according to the present embodiment has high strength and excellent bendability.

For example, it is preferable that the tensile strength (TS) is 980 MPa or more and the strength-bending angle balance (TS×α) is 85,000 MPa·deg or more.

<Manufacturing Method>

The hot-stamping formed body according to the present embodiment can obtain the effect as long as the above-described characteristics are provided regardless of the manufacturing method. However, any manufacturing method including the following steps is preferable because stable manufacturing can be achieved.

(I) A heating step of heating a steel sheet to an Ac3 point or higher.

(II) A forming step of performing forming (working) on the heated steel sheet in a temperature range of an Ms point or higher so that an amount of strain at the Ms point to the Ms point+100° C. becomes 10% or more while precipitation of ferrite and pearlite is prevented.

Hereinafter, each step will be described. Known conditions can be applied to steps or conditions not described.

[Heating Step]

In the heating step, the steel sheet to be subjected to hot stamping is heated to a temperature of the Ac3 point or higher. When the heating temperature is lower than the Ac3 point, the microstructure does not transform into austenite, and a sufficient volume fraction of martensite cannot be obtained after the hot stamping.

After heating to the Ac3 point or higher, holding for three minutes or longer is preferably performed so that the structure completely transforms into austenite.

The Ac3 point (° C.) can be obtained by the following formula.

$$Ac3(° C.)=910-203\times[\% C]^{0.5}+66\times[\% Si]-25\times[\% Mn]+700\times[\% P]-11\times[\% Cr]+109\times[\% Al]+400\times[\% Ti]-15.2\times[\% Ni]+104\times[\% V]+31.5\times[\% Mo]$$

Here, [% element] is an amount (mass %) of each element.

An upper limit of the heating temperature does not need to be limited, but is preferably 1100° C. or lower.

Since the chemical composition does not substantially change by the hot stamping (heating step+forming step), the chemical composition of the steel sheet to be subjected to the heating step is the same as a chemical composition of a desired hot-stamping formed body.

Properties other than the chemical composition (structure or the like) of the steel sheet are not limited, and for example, a hot-rolled steel sheet described in JIS G 3113: 2018, a cold-rolled steel sheet described in JIS G 3135:2018, a hot-dip galvanized steel sheet described in JIS G 3302: 2019, a hot-dip aluminum-plated steel sheet described in JIS G 3314:2019, a hot-dip zinc-5% aluminum alloy plated steel sheet described in JIS G 3317:2019, and a hot-dip 55% aluminum-zinc alloy plated steel sheet described in JIS G 3321:2019 can be used.

[Forming Step]

In the forming step, cooling and forming are performed on the heated steel sheet as described below.

In the manufacturing method of the hot-stamping formed body according to the present embodiment, in the cooling for the hot stamping, dislocations are introduced into supercooled austenite by plastic deformation in a supercooled austenite region, and the number of martensite nucleation sites is increased, whereby martensite finally obtained is homogenized (the standard deviation of the nanohardnesses is reduced) and is refined (the average grain size is reduced). In order to introduce dislocations into the supercooled austenite and obtain a sufficient amount of martensite nucleation sites, cooling and forming are performed on the heated steel sheet as described in 1) or 2) below.

1) Forming is performed so that an amount of plastic strain at the Ms point to the Ms point+100° C. becomes 10% or more while cooling to a temperature range of an Mf point or lower is performed at a cooling rate equal to or faster than an upper critical cooling rate.

2) Cooling is performed at a cooling rate equal to or faster than the upper critical cooling rate, the cooling is interrupted once or more, forming is performed so that the amount of plastic strain at the Ms point to the Ms point+100° C. becomes 10% or more, and thereafter cooling to a temperature range of the Mf point or lower is further performed at a cooling rate equal to or faster than the upper critical cooling rate.

In any of the cases 1) and 2), the cooling rate during the cooling is always set to be equal to or faster than the upper critical cooling rate. The upper critical cooling rate is a minimum cooling rate at which austenite is supercooled and martensite is generated without causing precipitation of ferrite and pearlite in the structure. When cooling is performed at a cooling rate slower than the upper critical cooling rate, ferrite and pearlite are generated, and the strength of the hot-stamping formed body becomes insufficient. The cooling may be water cooling, or the cooling may be performed by sandwiching the steel sheet between dies and using heat removal from the dies.

In addition, when a cooling stop temperature is higher than the Mf point, a sufficient volume fraction of martensite cannot be obtained. Therefore, the cooling stop temperature is set to the Mf point or lower.

In any of the cases 1) and 2), when the forming is performed so that the amount of plastic strain at the Ms point to the Ms point+100° C. becomes 10% or more, the forming may be performed even in a temperature range higher than the Ms point+100° C. That is, forming may be performed so that the plastic strain becomes 10% or more in a temperature range of the Ms point to the Ms point+100° C. after forming is performed in a temperature range of higher than the Ms point+100° C. Alternatively, in a case of performing forming while performing cooling, cooling may be started at a temperature range of higher than Ms+100° C. and forming may be ended so that the plastic strain becomes 10% or more in a temperature range of Ms to Ms+100° C. However, a forming end (for example, in a case of press forming, when a die reaches a bottom dead point) temperature (in a case of performing a plurality of times of forming, a final forming end temperature) is set to the Ms point or higher. When the forming is performed at a temperature lower than the Ms point, the forming is performed on the martensite generated by transformation, and residual ductility of the hot-stamping formed body decreases, so that the bendability decreases.

When the plastic strain at the Ms point to the Ms point+100° C. is less than 10%, the homogenization or refinement of martensite becomes insufficient.

The reason for limiting the amount of plastic strain at the Ms point to the Ms point+100° C. is that, in the case of forming in a temperature range of higher than Ms+100° C., some or all of the dislocations introduced by the forming are recovered and disappear. In a case where only some of the dislocations are recovered, a grain size distribution becomes inhomogeneous, and inhomogeneous deformation occurs during bending deformation, so that there is a concern that bendability decreases. In a case where all of the dislocations are recovered, fine grains cannot be obtained.

As described above, as long as the amount of plastic strain at the Ms point to the Ms point+100° C. is 10% or more, the effect of homogenization and refinement of martensite can be obtained even when forming is performed in a temperature range of the Ms point+100° C. or higher. However, there is a concern that the grain sizes become non-uniform due to forming in a temperature range of the Ms point+100° C. or higher. Therefore, from the viewpoint of bendability, it is preferable to perform forming only in a temperature range of the Ms point to the Ms point+100° C.

In the present embodiment, the plastic strain is a strain on an outer surface of a bend that can be obtained by t/(2R+t)×100 from a bend radius R and a sheet thickness t.

In addition, in the case of 2), a time during which the cooling is interrupted (a time during which cooling is not performed at the upper critical cooling rate or faster) needs to be shorter than a time to reach a ferritic transformation start line Fs or a bainitic transformation start line Bs on a time temperature transformation (TTT) curve. When the interruption time is long and exceeds Fs or Bs, ferrite, pearlite, or the like is formed, and a desired structure cannot be obtained.

By applying a surface pressure during forming, the martensitic transformation completion temperature (Mf point) rises, and a self-tempering effect can be obtained. In this case, the standard deviation of the nanohardness distribution decreases. Therefore, applying a surface pressure during forming is a more preferable manufacturing condition. In a case of applying the surface pressure, the surface pressure is preferably 10 MPa or more, more preferably 20 MPa or more, and even more preferably 30 MPa or more.

The upper critical cooling rate Vc (° C./sec), the Ms point (° C.), and the Mf point (° C.) are obtained by the following formulas. The following formulas are formulas for obtaining the Mf point at a surface pressure of 0 MPa, and in a case where the surface pressure is applied, the Mf point increases above the temperature obtained by the following formula.

$$\log 10(Vc) = 2.94 - 0.75(2.7 \times [\% \ C] + 0.4 \times [\% \ Si] + 1.0 \times [\% \ Mn] + 0.45 \times [\% \ Ni] + 0.8Cr + 2 \times [\% \ Mo])$$

In the hot-stamping formed body according to the present embodiment, the B content is 0.002% or more. However, in a case where the B content is less than 0.002%, the upper critical cooling rate Vc (° C./sec) is obtained by the following formula.

$$\log 10(Vc) = 2.94 - 0.75(2.7 \times [\% \ C] + 0.4 \times [\% \ Si] + 1.0 \times [\% \ Mn] + 0.45 \times [\% \ Ni] + 0.8Cr + 2 \times [\% \ Mo] - 1)$$

$$Ms(° \ C.) = 560.5 - 407.3 \times [\% \ C] - 7.3 \times [\% \ Si] - 37.8 \times [\% \ Mn] - 19.5 \times [\% \ Ni] - 19.8 \times [\% \ Cr] - 4.5 \times [\% \ Mo] - 20.5 \times [\% \ Cu]$$

$$Mf(° \ C.) = Ms - 209$$

Here, [% element] in the formulas is the amount of the element in steel by mass %.

In the hot-stamping formed body according to the present embodiment, an alloy layer may be formed on a surface (one surface or both surfaces).

The alloy layer is not limited, and may be, for example, an Fe—Al-based alloy layer or an Fe—Zn-based alloy layer. The Fe—Al-based alloy layer is an alloy layer containing 70 mass % or more of Fe and Al in total, and the Fe—Zn-based alloy layer is an alloy layer containing 70 mass % or more of Fe and Zn in total. Corrosion resistance is improved by providing the alloy layer.

A thickness of the alloy layer is preferably 10 to 100 μm.

The alloy layer is formed by performing hot stamping on a steel sheet having a plating layer (a Zn-based plating layer, an Al-based plating layer, or the like) so that the plating layer is alloyed with Fe in the steel sheet.

EXAMPLES

Steel sheets having the chemical compositions shown in Tables 1A and 1B and having a sheet thickness of 0.8 to 4.0 mm were prepared. Some of the steel sheets were subjected to hot-dip galvannealing.

Hot stamping (heating, cooling, and forming) were performed on the steel sheets under the conditions shown in Tables 2A to 2D to obtain hot-stamping formed bodies.

In the hot stamping, patterns were adopted in which 1) forming is performed so that an amount of plastic strain at an Ms point to the Ms point+100° C. becomes 10% or more while cooling to a temperature range of an Mf point or lower is performed at a cooling rate equal to or faster than an upper critical cooling rate, or 2) cooling is performed at a cooling rate equal to or faster than the upper critical cooling rate, the cooling is interrupted once or more, forming is performed so that the amount of plastic strain at the Ms point to the Ms point+100° C. becomes 10% or more, and thereafter cooling to a temperature range of the Mf point or lower is further performed at a cooling rate equal to or faster than the upper critical cooling rate.

For example, in the tables, formed body No. 1 shows that after heating to 910° C. was performed, while performing cooling to 25° C. at a cooling rate of 60° C./sec or faster, forming was performed at a time point when temperature was 430° C. In addition, formed body No. 2 shows that after heating to 910° C. was performed, cooling to 430° C. was performed at a cooling rate of 60° C./sec or faster, the cooling was interrupted once, forming was performed at that temperature, and after the forming, cooling to 25° C. was performed at a cooling rate of 60° C./sec or faster. In addition, formed body No. 3 shows that after heating to 910° C. was performed, cooling to 580° C. was performed at a cooling rate of 60° C./sec or faster, the cooling was interrupted once, forming (first) was performed at that temperature, and cooling to 430° C. was performed at a cooling rate of 50° C./sec or faster after the forming, the cooling was interrupted again, forming (second) was performed at that temperature, and after the forming, cooling to 25° C. was performed at a cooling rate of 50° C./sec or faster.

In a case where the cooling was interrupted, an interruption time was about 10 to 30 seconds in any case.

TABLE 1A

| Steel No. | Chemical composition (mass %) remainder is Fe and impurities | | | | | | | |
|---|---|---|---|---|---|---|---|---|
| | C | Si | Mn | P | S | N | Ti | B |
| 1 | 0.22 | 0.20 | 1.25 | 0.01 | 0.01 | 0.001 | 0.020 | 0.002 |
| 2 | 0.44 | 0.21 | 1.92 | 0.01 | 0.0011 | 0.0027 | 0.029 | 0.002 |
| 3 | 0.15 | 0.20 | 1.25 | 0.01 | 0.01 | 0.0001 | 0.020 | 0.002 |
| 4 | 0.50 | 0.20 | 1.25 | 0.01 | 0.01 | 0.0001 | 0.020 | 0.002 |
| 5 | 0.14 | 0.20 | 1.25 | 0.01 | 0.01 | 0.0001 | 0.020 | 0.002 |
| 6 | 0.51 | 0.20 | 1.25 | 0.01 | 0.01 | 0.0001 | 0.020 | 0.002 |
| 7 | 0.22 | 0.10 | 1.25 | 0.01 | 0.01 | 0.0001 | 0.020 | 0.002 |
| 8 | 0.22 | 3.00 | 1.25 | 0.01 | 0.01 | 0.0001 | 0.020 | 0.002 |
| 9 | 0.22 | 0.00 | 1.25 | 0.01 | 0.01 | 0.0001 | 0.020 | 0.002 |
| 10 | 0.22 | 3.10 | 1.25 | 0.01 | 0.01 | 0.0001 | 0.020 | 0.002 |
| 11 | 0.22 | 0.20 | 0.10 | 0.01 | 0.01 | 0.0001 | 0.020 | 0.002 |
| 12 | 0.22 | 0.20 | 3.00 | 0.01 | 0.01 | 0.0001 | 0.020 | 0.002 |
| 13 | 0.22 | 0.20 | 0.00 | 0.01 | 0.01 | 0.0001 | 0.020 | 0.002 |
| 14 | 0.22 | 0.20 | 3.10 | 0.01 | 0.01 | 0.0001 | 0.020 | 0.002 |
| 15 | 0.22 | 0.20 | 1.25 | 0.09 | 0.01 | 0.0001 | 0.020 | 0.002 |
| 16 | 0.22 | 0.20 | 1.25 | 0.01 | 0.02 | 0.0001 | 0.020 | 0.002 |
| 17 | 0.22 | 0.20 | 1.25 | 0.10 | 0.01 | 0.0001 | 0.020 | 0.002 |
| 18 | 0.22 | 0.20 | 1.25 | 0.01 | 0.10 | 0.0001 | 0.020 | 0.002 |
| 19 | 0.22 | 0.20 | 1.25 | 0.01 | 0.01 | 0.0001 | 0.150 | 0.002 |
| 20 | 0.22 | 0.20 | 1.25 | 0.01 | 0.01 | 0.0001 | 0.020 | 0.002 |
| 21 | 0.22 | 0.20 | 1.25 | 0.01 | 0.01 | 0.0001 | 0.160 | 0.002 |
| 22 | 0.22 | 0.20 | 1.25 | 0.01 | 0.01 | 0.0001 | 0.019 | 0.002 |
| 23 | 0.22 | 0.20 | 1.25 | 0.01 | 0.01 | 0.0001 | 0.020 | 0.002 |
| 24 | 0.22 | 0.20 | 1.25 | 0.01 | 0.01 | 0.0001 | 0.020 | 0.010 |
| 25 | 0.22 | 0.20 | 1.25 | 0.01 | 0.01 | 0.0001 | 0.020 | 0.001 |
| 26 | 0.22 | 0.20 | 1.25 | 0.01 | 0.01 | 0.0001 | 0.020 | 0.020 |
| 27 | 0.22 | 0.20 | 1.25 | 0.01 | 0.01 | 0.09 | 0.020 | 0.002 |
| 28 | 0.22 | 0.20 | 1.25 | 0.01 | 0.01 | 0.0001 | 0.020 | 0.002 |
| 29 | 0.22 | 0.20 | 1.25 | 0.01 | 0.01 | 0.0001 | 0.020 | 0.002 |
| 30 | 0.22 | 0.20 | 1.25 | 0.01 | 0.01 | 0.0001 | 0.020 | 0.002 |
| 31 | 0.22 | 0.20 | 1.25 | 0.01 | 0.01 | 0.0001 | 0.020 | 0.002 |
| 32 | 0.22 | 0.20 | 1.25 | 0.01 | 0.01 | 0.0001 | 0.020 | 0.002 |
| 33 | 0.22 | 0.20 | 1.25 | 0.01 | 0.01 | 0.0001 | 0.020 | 0.002 |
| 34 | 0.22 | 0.20 | 1.25 | 0.01 | 0.01 | 0.0001 | 0.020 | 0.002 |
| 35 | 0.22 | 0.20 | 1.25 | 0.01 | 0.01 | 0.0001 | 0.020 | 0.002 |
| 36 | 0.22 | 0.20 | 1.25 | 0.01 | 0.01 | 0.0001 | 0.020 | 0.002 |
| 37 | 0.22 | 0.20 | 1.25 | 0.01 | 0.01 | 0.0001 | 0.020 | 0.002 |
| 38 | 0.22 | 0.20 | 1.25 | 0.01 | 0.01 | 0.0001 | 0.020 | 0.002 |
| 39 | 0.22 | 0.20 | 1.25 | 0.01 | 0.01 | 0.0001 | 0.020 | 0.002 |
| 40 | 0.22 | 0.20 | 1.25 | 0.01 | 0.01 | 0.0001 | 0.020 | 0.002 |

TABLE 1B

| Steel No. | Al | Nb | Cr | Mo | Co | Ni | Cu | V | W | Ca | Mg | REM |
|---|---|---|---|---|---|---|---|---|---|---|---|---|
| 1 | 0.033 | | | | | | | | | | | |
| 2 | | 0.051 | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |
| 15 | | | | | | | | | | | | |
| 16 | | | | | | | | | | | | |
| 17 | | | | | | | | | | | | |
| 18 | | | | | | | | | | | | |
| 19 | | | | | | | | | | | | |
| 20 | | | | | | | | | | | | |
| 21 | | | | | | | | | | | | |
| 22 | | | | | | | | | | | | |
| 23 | | | | | | | | | | | | |
| 24 | | | | | | | | | | | | |
| 25 | | | | | | | | | | | | |
| 26 | | | | | | | | | | | | |
| 27 | | | | | | | | | | | | |
| 28 | 0.0002 | | | | | | | | | | | |
| 29 | 2.0 | | | | | | | | | | | |
| 30 | | 0.150 | | | | | | | | | | |
| 31 | | | 1.0 | | | | | | | | | |
| 32 | | | | 1.0 | | | | | | | | |
| 33 | | | | | 2.0 | | | | | | | |
| 34 | | | | | | 3.0 | | | | | | |
| 35 | | | | | | | 1.0 | | | | | |
| 36 | | | | | | | | 1.0 | | | | |
| 37 | | | | | | | | | 1.0 | | | |
| 38 | | | | | | | | | | 0.0100 | | |
| 39 | | | | | | | | | | | 0.0100 | |
| 40 | | | | | | | | | | | | 0.0100 |

TABLE 2A

| | | | | | | Manufacturing conditions | | | | |
|---|---|---|---|---|---|---|---|---|---|---|
| | | | | | | Heating step | Forming step | | | |
| Formed body No. | Steel No. | Upper critical cooling rate Vc (° C./sec) | Ms point (° C.) | Mf point (° C.) | Ac3 point. (° C.) | Heating temperature (° C.) | Minimum cooling rate (° C./sec) | Cooling stop temperature (° C.) | Forming start temperature (° C.) | Forming end temperature (° C.) |
| 1 | 1 | 31 | 422 | 213 | 815 | 910 | 60 | 25 | 430 | 424 |
| 2 | 1 | 31 | 422 | 213 | 815 | 910 | 60 | 430 | 430 | 430 |
| 3 | 1 | 31 | 422 | 213 | 815 | 910 | 60 | 580 | 580 | 580 |
| 4 | 1 | 31 | 422 | 213 | 815 | 910 | 60 | 430 | 430 | 430 |
| 5 | 1 | 31 | 422 | 213 | 815 | 910 | 250 | 25 | 530 | 505 |
| 6 | 2 | 4 | 307 | 98 | 760 | 700 | 250 | 25 | 355 | 330 |
| 7 | 2 | 4 | 307 | 98 | 760 | 910 | 1 | 25 | 380 | 380 |
| 8 | 2 | 4 | 307 | 98 | 760 | 910 | 250 | 380 | 380 | 355 |
| 9 | 2 | 4 | 307 | 98 | 760 | 910 | 250 | 130 | 380 | 355 |
| 10 | 1 | 31 | 422 | 213 | 815 | 910 | 250 | 25 | 700 | 675 |
| 11 | 1 | 31 | 422 | 213 | 815 | 910 | 250 | 25 | 270 | 245 |
| 12 | 1 | 31 | 422 | 213 | 815 | 910 | 250 | 25 | 440 | 415 |
| 13 | 5 | 46 | 455 | 246 | 831 | 910 | 250 | 25 | 460 | 435 |
| 14 | 6 | 8 | 304 | 95 | 762 | 910 | 250 | 25 | 380 | 355 |
| 15 | 9 | 36 | 424 | 215 | 799 | 910 | 250 | 25 | 430 | 405 |
| 16 | 10 | 4 | 401 | 192 | 1003 | 1100 | 250 | 25 | 410 | 385 |
| 17 | 13 | 272 | 469 | 260 | 843 | 910 | 250 | 25 | 480 | 455 |
| 18 | 14 | 1 | 352 | 143 | 765 | 910 | 250 | 25 | 380 | 355 |
| 19 | 17 | 31 | 422 | 213 | 875 | 910 | 250 | 25 | 430 | 405 |
| 20 | 18 | 31 | 422 | 213 | 812 | 910 | 250 | 25 | 430 | 405 |

TABLE 2A-continued

| | | | | | | Manufacturing conditions | | | | |
| | | | | | | Heating | Forming step | | | |
| Formed body No. | Steel No. | Upper critical cooling rate Vc (° C./sec) | Ms point (° C.) | Mf point (° C.) | Ac3 point. (° C.) | step Heating temperature (° C.) | Minimum cooling rate (° C./sec) | Cooling stop temperature (° C.) | Forming start temperature (° C.) | Forming end temperature (° C.) |
|---|---|---|---|---|---|---|---|---|---|---|
| 21 | 26 | 31 | 422 | 213 | 812 | 910 | 250 | 25 | 430 | 405 |
| 22 | 27 | 31 | 422 | 213 | 812 | 910 | 250 | 25 | 430 | 405 |
| 23 | 30 | 31 | 422 | 213 | 812 | 910 | 250 | 25 | 430 | 405 |
| 24 | 31 | 8 | 402 | 193 | 801 | 910 | 250 | 25 | 430 | 405 |
| 25 | 1 | 31 | 422 | 213 | 815 | 910 | 250 | 430 | 430 | 405 |
| 26 | 8 | 5 | 402 | 193 | 997 | 1000 | 250 | 430 | 430 | 405 |
| 27 | 3 | 44 | 451 | 242 | 828 | 910 | 250 | 25 | 460 | 435 |
| 28 | 4 | 9 | 308 | 99 | 763 | 910 | 250 | 25 | 380 | 355 |
| 29 | 7 | 34 | 423 | 214 | 805 | 910 | 250 | 25 | 430 | 405 |

TABLE 2B

| | | | | | | Manufacturing conditions | | | | |
| | | | | | | Heating | Forming step | | | |
| Formed body No. | Steel No. | Upper critical cooling rate Vc (° C./sec) | Ms point (° C.) | Mf point (° C.) | Ac3 point (° C.) | step Heating temperature (° C.) | Minimum cooling rate (° C./sec) | Cooling stop temperature (° C.) | Forming start temperature (° C.) | Forming end temperature (° C.) |
|---|---|---|---|---|---|---|---|---|---|---|
| 30 | 11 | 229 | 466 | 257 | 840 | 910 | 250 | 25 | 480 | 455 |
| 31 | 12 | 2 | 356 | 147 | 768 | 910 | 250 | 25 | 430 | 405 |
| 32 | 15 | 31 | 422 | 213 | 868 | 910 | 250 | 25 | 430 | 405 |
| 33 | 16 | 31 | 422 | 213 | 812 | 910 | 250 | 25 | 430 | 405 |
| 34 | 19 | 31 | 422 | 213 | 864 | 910 | 250 | 25 | 430 | 405 |
| 35 | 20 | 31 | 422 | 213 | 812 | 910 | 250 | 25 | 430 | 405 |
| 36 | 21 | 31 | 422 | 213 | 868 | 910 | 250 | 25 | 430 | 405 |
| 37 | 22 | 31 | 422 | 213 | 811 | 910 | 250 | 25 | 430 | 405 |
| 38 | 23 | 31 | 422 | 213 | 812 | 910 | 250 | 25 | 430 | 405 |
| 39 | 24 | 31 | 422 | 213 | 812 | 910 | 250 | 25 | 430 | 405 |
| 40 | 25 | 177 | 422 | 213 | 812 | 910 | 250 | 25 | 430 | 405 |
| 41 | 28 | 31 | 422 | 213 | 815 | 910 | 60 | 25 | 430 | 424 |
| 42 | 29 | 31 | 422 | 213 | 1030 | 1050 | 60 | 25 | 430 | 424 |
| 43 | 32 | 1 | 418 | 209 | 843 | 910 | 60 | 25 | 430 | 424 |
| 44 | 33 | 31 | 422 | 213 | 812 | 910 | 60 | 25 | 430 | 424 |
| 45 | 34 | 3 | 422 | 213 | 766 | 910 | 60 | 25 | 430 | 424 |
| 46 | 35 | 31 | 402 | 193 | 812 | 910 | 60 | 25 | 430 | 424 |
| 47 | 36 | 31 | 422 | 213 | 916 | 920 | 60 | 25 | 430 | 424 |
| 48 | 37 | 31 | 422 | 213 | 812 | 910 | 60 | 25 | 430 | 424 |
| 49 | 38 | 31 | 422 | 213 | 812 | 910 | 60 | 25 | 430 | 424 |
| 50 | 39 | 31 | 422 | 213 | 812 | 910 | 60 | 25 | 430 | 424 |
| 51 | 40 | 31 | 422 | 213 | 812 | 910 | 60 | 25 | 430 | 424 |
| 52 | 2 | 4 | 307 | 98 | 815 | 910 | 250 | 25 | 400 | 375 |
| 53 | 4 | 9 | 308 | 99 | 760 | 910 | 250 | 380 | 380 | 380 |
| 54 | 2 | 4 | 307 | 98 | 815 | 910 | 250 | 600 | 600 | 600 |
| 55 | 2 | 4 | 307 | 98 | 815 | 910 | 250 | 25 | 400 | 375 |
| 56 | 2 | 4 | 307 | 98 | 815 | 910 | 250 | 600 | 600 | 600 |
| 57 | 4 | 4 | 308 | 99 | 763 | 910 | 250 | 25 | 380 | 355 |
| 58 | 2 | 4 | 307 | 98 | 815 | 910 | 4 | 25 | 330 | 329.6 |

TABLE 2C

| | Manufacturing conditions | | | | | | | | | |
| | Forming step | | | | | | | | | |
| Formed body No. | Minimum cooling rate (° C./sec) | Cooling stop temperature (° C.) | Forming start temperature (° C.) | Forming end temperature (° C.) | Minimum cooling rate (° C./sec) | Cooling stop temperature (° C.) | Amount of plastic strain of entire step (%) | Amount of plastic strain at Ms point to Ms + 100° C. (%) | Final forming end temperature (° C.) | Surface pressure during first forming (MPa) |
|---|---|---|---|---|---|---|---|---|---|---|
| 1 | — | — | — | — | — | — | 10 | 10 | 424 | 0 |
| 2 | 60 | 25 | — | — | — | — | 10 | 10 | 430 | 0 |
| 3 | 50 | 430 | 430 | 430 | 50 | 25 | 10 | 10 | 430 | 0 |

TABLE 2C-continued

| | Manufacturing conditions Forming step | | | | | | | | | |
|---|---|---|---|---|---|---|---|---|---|---|
| Formed body No. | Minimum cooling rate (° C./sec) | Cooling stop temperature (° C.) | Forming start temperature (° C.) | Forming end temperature (° C.) | Minimum cooling rate (° C./sec) | Cooling stop temperature (° C.) | Amount of plastic strain of entire step (%) | Amount of plastic strain at Ms point to Ms + 100° C. (%) | Final forming end temperature (° C.) | Surface pressure during first forming (MPa) |
| 4 | 5 | 25 | — | — | — | — | 10 | 10 | 430 | 0 |
| 5 | — | — | — | — | — | — | 10 | 0 | 505 | 0 |
| 6 | — | — | — | — | — | — | 10 | 10 | 330 | 0 |
| 7 | — | — | — | — | — | — | 10 | 10 | 380 | 0 |
| 8 | 1 | 25 | — | — | — | — | 10 | 10 | 355 | 0 |
| 9 | 0.5 | 25 | — | — | — | — | 10 | 0 | 355 | 0 |
| 10 | — | — | — | — | — | — | 10 | 0 | 675 | 0 |
| 11 | — | — | — | — | — | — | 10 | 0 | 245 | 0 |
| 12 | — | — | — | — | — | — | 10 | 4 | 415 | 0 |
| 13 | — | — | — | — | — | — | 10 | 10 | 435 | 0 |
| 14 | — | — | — | — | — | — | 10 | 10 | 355 | 0 |
| 15 | — | — | — | — | — | — | 10 | 10 | 405 | 0 |
| 16 | — | — | — | — | — | — | 10 | 10 | 385 | 0 |
| 17 | — | — | — | — | — | — | 10 | 10 | 455 | 0 |
| 18 | — | — | — | — | — | — | 10 | 10 | 355 | 0 |
| 19 | — | — | — | — | — | — | 10 | 10 | 405 | 0 |
| 20 | — | — | — | — | — | — | 10 | 10 | 405 | 0 |
| 21 | — | — | — | — | — | — | 10 | 10 | 405 | 0 |
| 22 | — | — | — | — | — | — | 10 | 10 | 405 | 0 |
| 23. | — | — | — | — | — | — | 10 | 10 | 405 | 0 |
| 24 | — | — | — | — | — | — | 10 | 10 | 405 | 0 |
| 25 | 60 | 25 | — | — | — | — | 10 | 10 | 405 | 50 |
| 26 | 60 | 25 | — | — | — | — | 10 | 10 | 405 | 0 |
| 27 | — | — | — | — | — | — | 10 | 10 | 435 | 0 |
| 28 | — | — | — | — | — | — | 10 | 10 | 355 | 0 |
| 29 | — | — | — | — | — | — | 10 | 10 | 405 | 0 |

TABLE 2D

| | Manufacturing conditions Forming step | | | | | | | | | |
|---|---|---|---|---|---|---|---|---|---|---|
| Formed body No. | Minimum cooling rate (° C./sec) | Cooling stop temperature (° C.) | Forming start temperature (° C.) | Forming end temperature (° C.) | Minimum cooling rate (° C./sec) | Cooling stop temperature (° C.) | Amount of plastic strain of entire step (%) | Amount of plastic strain at Ms point to Ms + 100° C. (%) | Final forming temperature end (° C.) | Surface pressure during first forming (MPa) |
| 30 | — | — | — | — | — | — | 10 | 10 | 455 | 0 |
| 31 | — | — | — | — | — | — | 10 | 10 | 405 | 0 |
| 32 | — | — | — | — | — | — | 10 | 10 | 405 | 0 |
| 33 | — | — | — | — | — | — | 10 | 10 | 405 | 0 |
| 34 | — | — | — | — | — | — | 10 | 10 | 405 | 0 |
| 35 | — | — | — | — | — | — | 10 | 10 | 405 | 0 |
| 36 | — | — | — | — | — | — | 10 | 10 | 405 | 0 |
| 37 | — | — | — | — | — | — | 10 | 10 | 405 | 0 |
| 38 | — | — | — | — | — | — | 10 | 10 | 405 | 0 |
| 39 | — | — | — | — | — | — | 10 | 10 | 405 | 0 |
| 40 | — | — | — | — | — | — | 10 | 10 | 405 | 0 |
| 41 | — | — | — | — | — | — | 10 | 10 | 424 | 0 |
| 42 | — | — | — | — | — | — | 10 | 10 | 424 | 0 |
| 43 | — | — | — | — | — | — | 10 | 10 | 424 | 0 |
| 44 | — | — | — | — | — | — | 10 | 10 | 424 | 0 |
| 45 | — | — | — | — | — | — | 10 | 10 | 424 | 0 |
| 46 | — | — | — | — | — | — | 10 | 10 | 424 | 0 |
| 47 | — | — | — | — | — | — | 10 | 10 | 424 | 0 |
| 48 | — | — | — | — | — | — | 10 | 10 | 424 | 0 |
| 49 | — | — | — | — | — | — | 10 | 10 | 424 | 0 |
| 50 | — | — | — | — | — | — | 10 | 10 | 424 | 0 |
| 51 | — | — | — | — | — | — | 10 | 10 | 424 | 0 |
| 52 | — | — | — | — | — | — | 20 | 20 | 375 | 0 |
| 53 | 60 | 25 | — | — | — | — | 15 | 15 | 430 | 0 |
| 54 | 60 | 350 | 350 | 350 | 60 | 25 | 20 | 15 | 350 | 0 |
| 55 | — | — | — | — | — | — | 20 | 20 | 375 | 10 |
| 56 | 60 | 350 | 350 | 350 | 60 | 25 | 15 | 10 | 350 | 0 |

TABLE 2D-continued

| | Manufacturing conditions Forming step | | | | | | | | | |
|---|---|---|---|---|---|---|---|---|---|---|
| Formed body No. | Minimum cooling rate (° C./sec) | Cooling stop temperature (° C.) | Forming start temperature (° C.) | Forming end temperature (° C.) | Minimum cooling rate (° C./sec) | Cooling stop temperature (° C.) | Amount of plastic strain of entire step (%) | Amount of plastic strain at Ms point to Ms + 100° C. (%) | Final forming temperature end (° C.) | Surface pressure during first forming (MPa) |
| 57 | — | — | — | — | — | — | 10 | 10 | 355 | 20 |
| 58 | — | — | — | — | — | — | 10 | 10 | 300 | 0 |

For the hot-stamping formed bodies, a volume fraction of each phase in a microstructure, a standard deviation of a frequency distribution of nanohardnesses, and an average grain size were measured by the above-described methods. In a case of having an alloy layer (Fe—Zn-based alloy layer), a thickness of the alloy layer was measured. The results are shown in Tables 3A and 3B.

In addition, a tensile strength TS (MPa) and a bending angle α (°) were obtained in the following manners. The results are shown in Table 3C and Table 3D.

<Tensile Test>
A tensile test was conducted in accordance with JIS Z 2241:2011 by collecting a JIS No. 5 shape test piece from a flat portion of the hot-stamping formed body so that a direction perpendicular to a rolling direction was a longitudinal direction of the tensile test piece.

<VDA Bending Test>
A VDA bending test was conducted in accordance with the VDA 238-100 standard by cutting out a 60 mm square test piece from a flat portion of the hot-stamping formed body so that the rolling direction was parallel to a bent ridge.

TABLE 3A

| | | Hot-stamping formed body | | | | | |
|---|---|---|---|---|---|---|---|
| | | Microstructure | | | | | |
| | | Volume fraction | | | | | |
| Formed body No. | Steel No. | Martensite (%) | Retained austenite (%) | Others (%) | Standard deviation (GPa) | Average grain size (μm) | Alloy layer Thickness (μm) |
| 1 | 1 | 100 | 0 | 0 | 0.68 | 3.5 | — |
| 2 | 1 | 100 | 0 | 0 | 0.69 | 3.5 | — |
| 3 | 1 | 100 | 0 | 0 | 0.68 | 3.5 | — |
| 4 | 1 | 40 | 2 | 58 | 0.40 | 10.0 | — |
| 5 | 1 | 100 | 0 | | 0.90 | 5.0 | — |
| 6 | 2 | 50 | 2 | 48 | 1.50 | 20.0 | — |
| 7 | 2 | 5 | 1 | 94 | 0.60 | 20.0 | — |
| 8 | 2 | 5 | 2 | 93 | 0.50 | 10.0 | — |
| 9 | 2 | 80 | 2 | 18 | 0.50 | 5.0 | — |
| 10 | 1 | 100 | 0 | 0 | 0.72 | 5.3 | — |
| 11 | 1 | 100 | 0 | 0 | 0.87 | 6.0 | — |
| 12 | 1 | 100 | 0 | 0 | 0.87 | 6.0 | — |
| 13 | 5 | 100 | 0 | 0 | 0.40 | 4.0 | — |
| 14 | 6 | 100 | 0 | 0 | 0.90 | 1.0 | — |
| 15 | 9 | 100 | 0 | 0 | 0.68 | 3.5 | — |
| 16 | 10 | 100 | 0 | 0 | 0.68 | 3.5 | — |
| 17 | 13 | 0 | 0 | 100 | 0.68 | 3.5 | — |
| 18 | 14 | 100 | 0 | 0 | 0.38 | 3.5 | — |
| 19 | 17 | 100 | 0 | 0 | 0:38 | 3.5 | — |
| 20 | 18 | 100 | 0 | 0 | 0.38 | 3.5 | — |
| 21 | 26 | 100 | 0 | 0 | 0.38 | 3.5 | — |
| 22 | 27 | 100 | 0 | 0 | 0.38 | 3.5 | — |
| 23 | 30 | 100 | 0 | 0 | 0.38 | 3.5 | — |
| 24 | 31 | 100 | 0 | 0 | 0.38 | 3.5 | — |
| 25 | 1 | 100 | 0 | 0 | 0.60 | 3.5 | — |
| 26 | 8 | 90 | 10 | 0 | 0.69 | 3.5 | — |
| 27 | 3 | 100 | 0 | 0 | 0.41 | 3.8 | — |
| 28 | 4 | 100 | 0 | 0 | 0.38 | 1.1 | — |
| 29 | 7 | 100 | 0 | 0 | 0.68 | 3.5 | — |

TABLE 3B

| Formed body No. | Steel No. | Microstructure Volume fraction Martensite (%) | Retained austenite (%) | Others (%) | Standard deviation (GPa) | Average grain size (μm) | Alloy layer Thickness (μm) |
|---|---|---|---|---|---|---|---|
| 30 | 11 | 100 | 0 | 0 | 0.34 | 3.9 | — |
| 31 | 12 | 100 | 0 | 0 | 0.28 | 2.4 | — |
| 32 | 15 | 100 | 0 | 0 | 0.65 | 3.6 | — |
| 33 | 16 | 100 | 0 | 0 | 0.65 | 3.7 | — |
| 34 | 19 | 100 | 0 | 0 | 0.69 | 3.5 | — |
| 35 | 20 | 100 | 0 | 0 | 0.69 | 3.5 | — |
| 36 | 21 | 100 | 0 | 0 | 0.68 | 3.2 | — |
| 37 | 22 | 100 | 0 | 0 | 0.67 | 3.2 | — |
| 38 | 23 | 100 | 0 | 0 | 0.69 | 3.5 | — |
| 39 | 24 | 100 | 0 | 0 | 0.69 | 3.5 | — |
| 40 | 25 | 95 | 0 | 5 | 0.30 | 9.1 | — |
| 41 | 28 | 100 | 0 | 0 | 0.68 | 3.3 | — |
| 42 | 29 | 100 | 0 | 0 | 0.68 | 3.2 | — |
| 43 | 32 | 100 | 0 | 0 | 0.68 | 3.3 | — |
| 44 | 33 | 100 | 0 | 0 | 0.68 | 3.3 | — |
| 45 | 34 | 100 | 0 | 0 | 0.68 | 3.4 | — |
| 46 | 35 | 100 | 0 | 0 | 0.68 | 3.3 | — |
| 47 | 36 | 100 | 0 | 0 | 0.68 | 3.3 | — |
| 48 | 37 | 100 | 0 | 0 | 0.68 | 3.2 | — |
| 49 | 38 | 100 | 0 | 0 | 0.68 | 3.3 | — |
| 50 | 39 | 100 | 0 | 0 | 0.68 | 3.4 | — |
| 51 | 40 | 100 | 0 | 0 | 0.68 | 3.3 | — |
| 52 | 2 | 100 | 0 | 0 | 0.45 | 1.3 | — |
| 53 | 4 | 100 | 0 | 0 | 0.42 | 0.9 | — |
| 54 | 2 | 100 | 0 | 0 | 0.39 | 1.2 | — |
| 55 | 2 | 100 | 0 | 0 | 0.43 | 1.1 | 20 |
| 56 | 2 | 100 | 0 | 0 | 0.40 | 1.3 | 50 |
| 57 | 4 | 100 | 0 | 0 | 0.37 | 1.2 | 80 |
| 58 | 2 | 91 | 2 | Bainite: 7 | 0.53 | 2.3 | — |

TABLE 3C

| Formed body No. | TS (MPa) | Bending angle (°) | TS × α (MPa · deg) | Note |
|---|---|---|---|---|
| 1 | 1200 | 75 | 90000 | Invention Example |
| 2 | 1064 | 83 | 88119 | Invention Example |
| 3 | 1250 | 72 | 90000 | Invention Example |
| 4 | 790 | 92 | 72680 | Comparative Example |
| 5 | 1211 | 61 | 73871 | Comparative Example |
| 6 | 791 | 84 | 66444 | Comparative Example |
| 7 | 781 | 95 | 74195 | Comparative Example |
| 8 | 878 | 80 | 70240 | Comparative Example |
| 9 | 1509 | 54 | 81486 | Comparative Example |
| 10 | 1267 | 51 | 64046 | Comparative Example |
| 11 | 1499 | 48 | 71952 | Comparative Example |
| 12 | 1545 | 43 | 66435 | Comparative Example |
| 13 | 795 | 87 | 69165 | Comparative Example |
| 14 | 2489 | 23 | 57247 | Comparative Example |
| 15 | 1230 | 64 | 78720 | Comparative Example |
| 16 | 1530 | 52 | 79560 | Comparative Example |
| 17 | 470 | 92 | 43240 | Comparative Example |
| 18 | 1550 | 35 | 54250 | Comparative Example |
| 19 | 1540 | 48 | 73920 | Comparative Example |
| 20 | 1550 | 45 | 69750 | Comparative Example |
| 21 | 1510 | 51 | 77010 | Comparative Example |
| 22 | 1540 | 61 | 93940 | Invention Example |
| 23 | 1510 | 58 | 87580 | Invention Example |
| 24 | 1560 | 60 | 93600 | Invention Example |
| 25 | 1064 | 85 | 90428 | Invention Example |
| 26 | 1200 | 83 | 99396 | Invention Example |
| 27 | 980 | 110 | 107800 | Invention Example |
| 28 | 2433 | 37 | 90021 | Invention Example |
| 29 | 1288 | 75 | 96600 | Invention Example |

TABLE 3D

| Formed body No. | TS (MPa) | Bending angle (°) | TS × α (MPa · deg) | Note |
|---|---|---|---|---|
| 30 | 990 | 99 | 98010 | Invention Example |
| 31 | 1610 | 62 | 99820 | Invention Example |
| 32 | 1100 | 80 | 88000 | Invention Example |
| 33 | 1150 | 79 | 90850 | Invention Example |
| 34 | 1010 | 85 | 85850 | Invention Example |
| 35 | 1210 | 75 | 90750 | Invention Example |
| 36 | 1090 | 54 | 58860 | Comparative Example |
| 37 | 1260 | 48 | 60480 | Comparative Example |
| 38 | 1032 | 83 | 85480 | Invention Example |
| 39 | 1310 | 75 | 98250 | Invention Example |
| 40 | 1100 | 55 | 60500 | Comparative Example |
| 41 | 1066 | 83 | 88119 | Invention Example |
| 42 | 1067 | 80 | 85360 | Invention Example |

TABLE 3D-continued

| | Hot-stamping formed body Properties | | | |
|---|---|---|---|---|
| Formed body No. | TS (MPa) | Bending angle (°) | TS × α (MPa · deg) | Note |
| 43 | 1064 | 83 | 88312 | Invention Example |
| 44 | 1063 | 83 | 88229 | Invention Example |
| 45 | 1067 | 83 | 88561 | Invention Example |
| 46 | 1066 | 83 | 88478 | Invention Example |
| 47 | 1066 | 83 | 88478 | Invention Example |
| 48 | 1068 | 83 | 88644 | Invention Example |
| 49 | 1070 | 83 | 88810 | Invention Example |
| 50 | 1073 | 83 | 89059 | Invention Example |
| 51 | 1058 | 83 | 87814 | Invention Example |
| 52 | 2320 | 41 | 95120 | Invention Example |
| 53 | 2210 | 43 | 95030 | Invention Example |
| 54 | 2150 | 44 | 94600 | Invention Example |
| 55 | 2431 | 36 | 87516 | Invention Example |
| 56 | 2098 | 41 | 86018 | Invention Example |
| 57 | 2341 | 38 | 88958 | Invention Example |
| 58 | 1985 | 49 | 97265 | Invention Example |

As can be seen from the results of Tables 1A to 3D, in invention examples, the chemical composition and the microstructure (the volume fraction of each phase, the standard deviation of the frequency distribution of nano-hardnesses, and the average grain size) were within the ranges of the present invention, and as a result, high strength and excellent bendability were obtained.

Contrary to this, in comparative examples, the chemical composition was outside of the range of the present invention, or the manufacturing method was not preferable, so that a predetermined microstructure could not be obtained. As a result, at least one of strength and bendability was inferior.

INDUSTRIAL APPLICABILITY

According to the present invention, it is possible to provide a hot-stamping formed body having high strength and excellent bendability. This hot-stamping formed body contributes to an improvement in collision resistance of a vehicle, and thus has high industrial applicability.

What is claimed is:

1. A hot-stamping formed body comprising, as a chemical composition, by mass %:
   C: 0.15% or more and 0.50% or less;
   Si: 0.10% or more and 3.00% or less;
   Mn: 0.10% or more and 3.00% or less;
   P: less than 0.10%;
   S: less than 0.10%;
   N: less than 0.10%;
   Ti: 0.020% or more and 0.150% or less;
   B: 0.002% or more and 0.010% or less;
   Al: 0% or more and 2.0% or less;
   Nb: 0% or more and 0.150% or less;
   Cr: 0% or more and 1.0% or less;
   Mo: 0% or more and 1.0% or less;
   Co: 0% or more and 2.0% or less;
   Ni: 0% or more and 3.0% or less;
   Cu: 0% or more and 1.0% or less;
   V: 0% or more and 1.0% or less;
   W: 0% or more and 1.0% or less;
   Ca: 0% or more and 0.0100% or less;
   Mg: 0% or more and 0.0100% or less;
   REM: 0% or more and 0.0100% or less; and
   a remainder including Fe and impurities,
   wherein a microstructure of the hot-stamping formed body includes, by volume fraction, 85% or more of martensite and less than 15% of retained austenite, and
   in the microstructure, a standard deviation of a frequency distribution of nanohardnesses is 0.70 GPa or less, and an average grain size is 4.0 μm or less.

2. The hot-stamping formed body according to claim 1, comprising, as the chemical composition, by mass %, one or more of:
   Al: 0.0002% or more and 2.0% or less;
   Nb: 0.010% or more and 0.150% or less;
   Cr: 0.1% or more and 1.0% or less;
   Mo: 0.1% or more and 1.0% or less;
   Co: 0.1% or more and 2.0% or less;
   Ni: 0.1% or more and 3.0% or less;
   Cu: 0.1% or more and 1.0% or less;
   V: 0.1% or more and 1.0% or less;
   W: 0.1% or more and 1.0% or less;
   Ca: 0.0010% or more and 0.0100% or less;
   Mg: 0.0010% or more and 0.0100% or less; and
   REM: 0.0010% or more and 0.0100% or less.

3. The hot-stamping formed body according to claim 1, wherein a surface of the hot-stamping formed body has an alloy layer.

4. The hot-stamping formed body according to claim 2, wherein a surface of the hot-stamping formed body has an alloy layer.

* * * * *